(12) United States Patent
Sandoval

(10) Patent No.: US 8,184,952 B2
(45) Date of Patent: May 22, 2012

(54) SEGMENT BOUNDARY OBFUSCATION

(75) Inventor: Frank Sandoval, Louisville, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 790 days.

(21) Appl. No.: 12/332,495

(22) Filed: Dec. 11, 2008

(65) Prior Publication Data

US 2010/0150527 A1    Jun. 17, 2010

(51) Int. Cl.
  *H04N 9/80*    (2006.01)
  *H04N 5/783*   (2006.01)
  *H04N 7/12*    (2006.01)
  *H04N 7/167*   (2011.01)
  *G06F 7/04*    (2006.01)

(52) U.S. Cl. .................. 386/248; 386/344; 375/240.26; 375/240.27; 375/240.28; 380/239; 726/30

(58) Field of Classification Search .................. 386/248, 386/344, E5.028, E5.052; 375/240.26, 240.27, 375/240.28, E7.004, E7.279; 380/239; 726/30
See application file for complete search history.

(56) References Cited

U.S. PATENT DOCUMENTS

2004/0040035 A1 *  2/2004  Carlucci et al. .................. 725/32
2006/0075449 A1 *  4/2006  Jagadeesan et al. .......... 725/113

* cited by examiner

*Primary Examiner* — Thai Tran
*Assistant Examiner* — Syed Hasan
(74) *Attorney, Agent, or Firm* — Brooks Kushman P.C.

(57) ABSTRACT

A method and system for obfuscating segment boundary markers, such as but not limited to obfuscating boundary markers used to identify beginning and/or ending boundaries of a sequence of segments forming a programming event. The obfuscation may be achieved by embedding decoy and offset boundary markers within the sequence of segments.

19 Claims, 2 Drawing Sheets

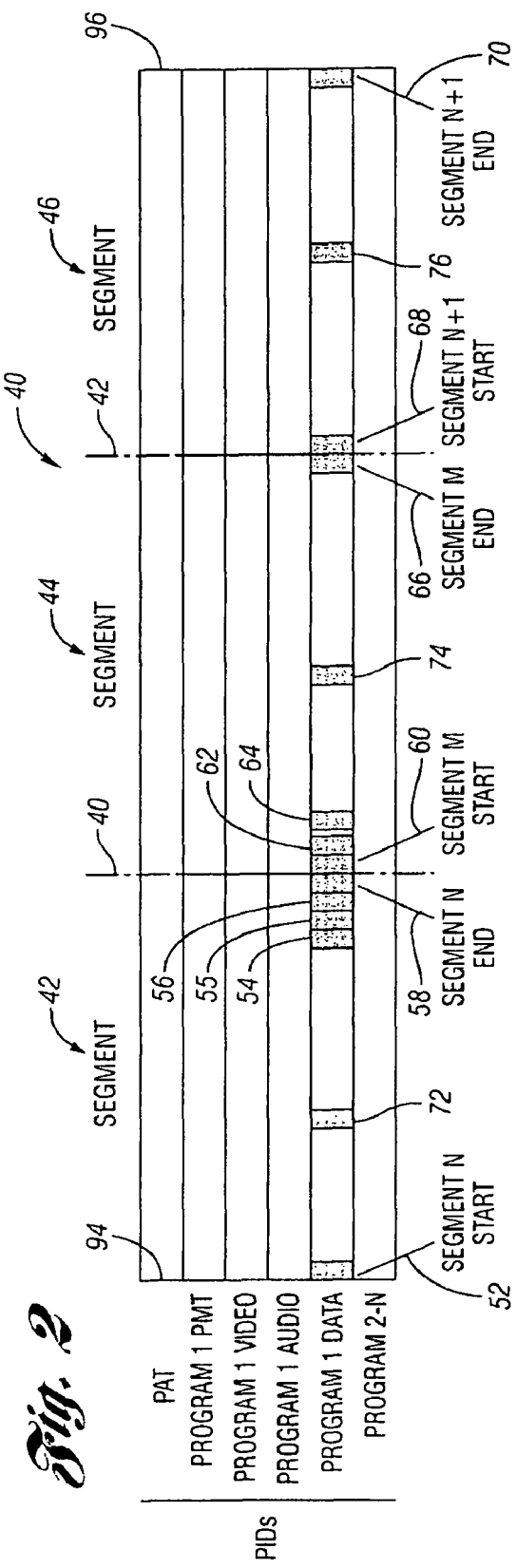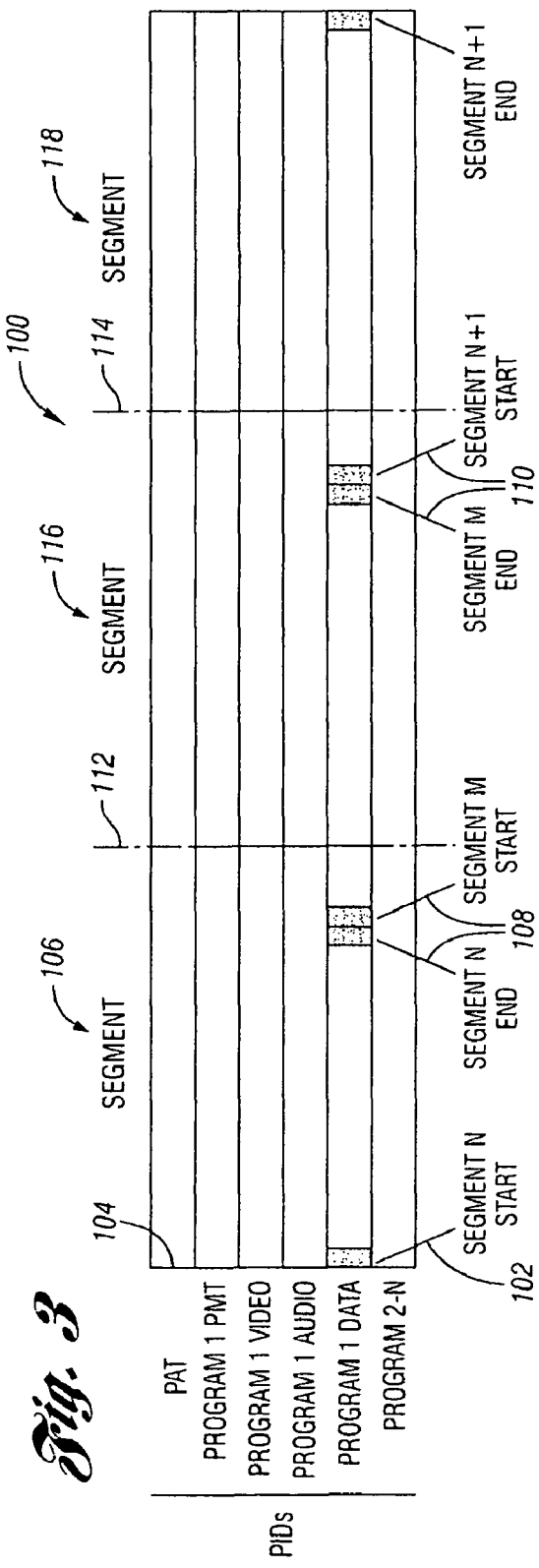

SEGMENT BOUNDARY OBFUSCATION

BACKGROUND OF THE INVENTION

1. Field of the Invention

The present invention relates to obfuscating segment boundary markers, such as but not limited to obfuscating boundary markers used to identify beginning and/or ending boundaries of a sequence of segments forming a programming event.

2. Background Art

A sequence of segments forming a programming event, such as but not limited to a linear or non-linear television transmission, can include a number of boundary marker and content identifier messages. A device supporting output of the programming event relies upon these messages to perform any number of operations. Typically, the boundary markers define a beginning and ending point for each segment and the content identifiers identify the content carried within the segment.

Some of the devices supporting playback, such as digital video recorders (DVRs), may look for certain boundary markers and content identifiers in an effort to manipulate user exposure to certain portions of the programming event, such as to support fast-forwarding through commercial breaks and replacing commercials run during the commercial break with other content (referred to as digital program insertion (DPI)). This is problematic to advertisers and service providers relying on viewership of the advertisements to support revenue generation and sales.

BRIEF DESCRIPTION OF THE DRAWINGS

The present invention is pointed out with particularity in the appended claims. However, other features of the present invention will become more apparent and the present invention will be best understood by referring to the following detailed description in conjunction with the accompany drawings in which:

FIG. 2 illustrates an exemplary transport stream having segments in accordance with one non-limiting aspect of the present invention; and FIG. 3 illustrates the transport stream using an offset message in accordance with one non-limiting aspect of the present invention.

DETAILED DESCRIPTION OF THE PREFERRED EMBODIMENT(S)

Figure 1:
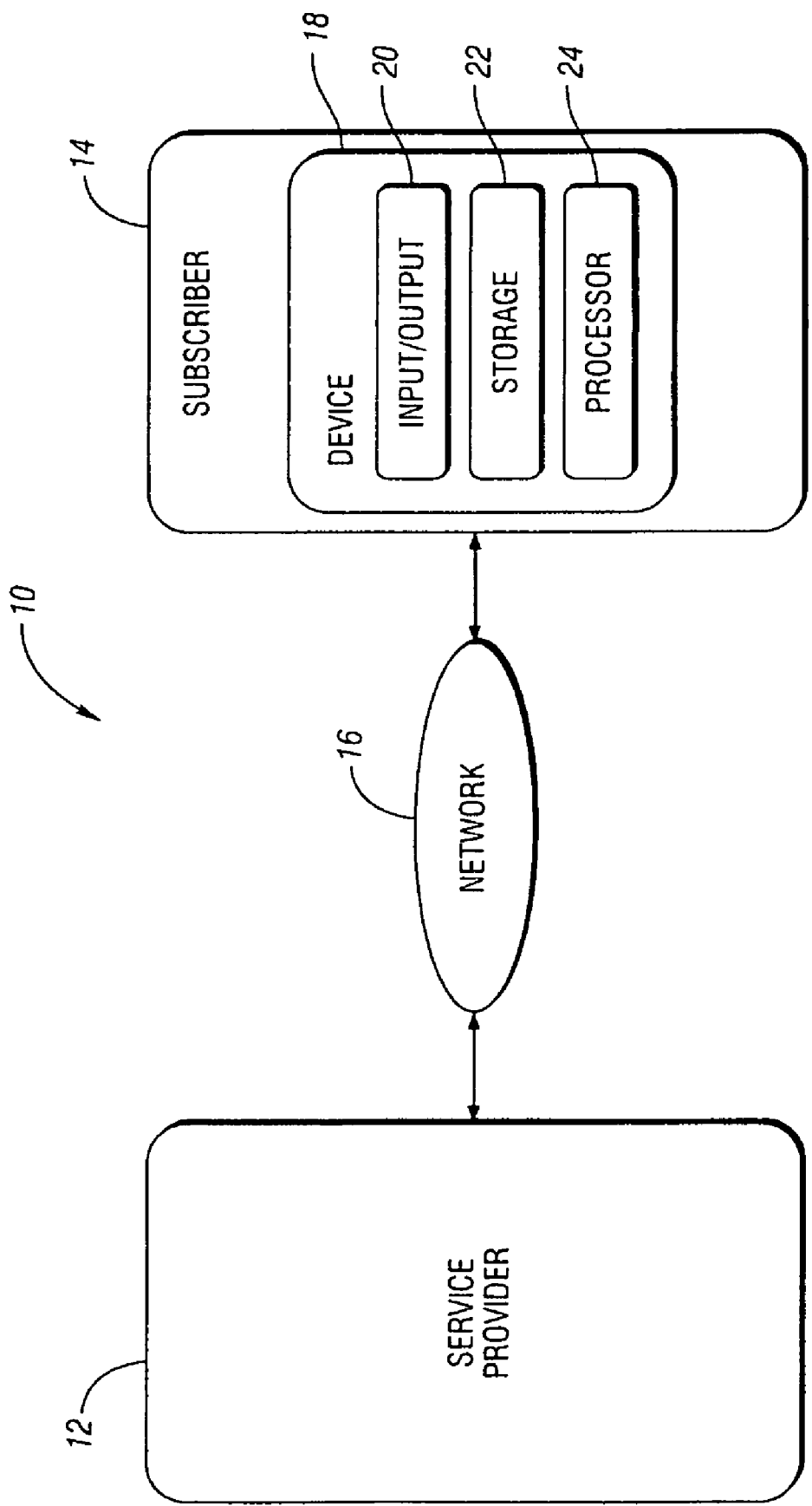
FIG. 1 illustrates a system for supporting programming events in accordance with one non-limiting aspect of the present invention.

FIG. 1 illustrates a system 10 for supporting programming events in accordance with one non-limiting aspect of the present invention. The system includes a service provider 12 to facilitate sourcing content signals for transmission to one or more subscribers 14 over a network 16. For exemplary purposes, the present invention is predominately described with respect to the service provider 12 supporting signal transmissions associated with television based programming events, such as but not limited to those associated with linear and/or non-linear television transmissions of programs, movies, pictures, audio, or other types of transmission supported by a multiple system operator (MSO).

The network 16 supporting the transmissions may be any type of wireline or wireless network suitable to transporting signals according to any type of transmission protocol. While a single representation of the network 16 is shown, the illustration is intended to reflect any mechanism for delivering programming events to any number of subscribers 14. The network 16 may be a cable, satellite or other television network, a wireless telephone network, a home network, and/or some combination thereof The subscriber 14 may be associated with an output device 18 for outputting the received signals. The output device 18 may include an input/output 20, computer-readable storage medium 22, and/or a processor 24 to execute the operations contemplated by the present invention. The present invention is not intended to be limited to any particular output device 18 and contemplates the output device 18 varying depending on the network transmission requirements and output requirements of the transmitted content.

The present invention, however, contemplates the system 10 being particularly suited to supporting programming events of the type employed to support content playback through a sequential procession of segments, regardless of whether the content is played on a mobile phone, computer, or television. The segments may generally be described as logically distinct regions of content. A programming event, such as a broadcast TV show or a VOD content asset for example, may be used to generally explain one type of programming event composed of a number of 'segments'. A television episode might be decomposed into a sequence of segments such as: Ad_1: Ad_2: episode 99 segment 1: Ad_3: Ad_4: episode 99 segment 2: and so on. A VOD asset might be presented to a viewer as pre-roll_Ad:VOD content:post-t_roll_Ad.

This exemplary listing of segments demonstrates a sequential procession between one type of segment and another where one type of segment is used to carry the content and another type of segment is used to carry advertisements or other types of materials. FIG. 2 illustrates an exemplary transport stream 40 used to transport a similar sequence of segments 42, 44, 46 forming a programming event in accordance with one non-limiting aspect of the present invention.

The content stream 40 is shown for exemplary purposes as being a Moving Pictures Expert Group (MPEG) transport stream. The illustration shows a sequence where a content segment 42 precedes an adjoining advertisement segment 44, which is then followed by an adjoining content segment 46. This sequence may be employed in the transmission of a television program where the television program is temporarily interrupted to show a commercial or where a commercial (pop-up) is overlaid over a portion of the television program.

One or more messages 52, 54, 56, 58, 60, 62, 64, 66, 68, 70, 72, 74, 76 may be embedded within the transport stream 40 to identify the respective segments 42, 44, 46. As shown, messages 52, 58, 60, 66, 68, 70, defined as boundary markers, are embedded within each segment 42, 44, 46 to identify a beginning and an ending. The messages 52, 58, 60, 66, 68, 70 may include data or information that identifies them to the output device 18 as being segment boundary markers. The messages 52, 58, 60, 66, 68, 70 may be positioned at the beginning and ending of the segments so that their location marks the actual beginning and ending portions of the segment. The messages may be carried within a program data elementary stream of the MPEG transport stream 40 used to support delivery of the programming event.

Optionally, messages 72, 74, 76, defined as segment identifiers, may be used to identify the content carried within the segments, such as by name, source, number, etc., and/or to provide some other indication of the segment 42, 44, 46 or the content carried in the segments, such as an unique segment ID or other unique segment reference. Of course, one or more of the boundary marker massages 52, 58, 60, 68, 70 may include the same information. Several schemes may be used to unambiguously identify content, including: ISAN, ProviderID/AssetID, AdID, and others. It may not be practical to converge on a single scheme, as some business domains may have already adopted a certain scheme. The present invention can accommodate this by associating every identifier with its 'type', or scheme.

One non-limiting aspect of the present invention also contemplates including at least one decoy 54, 55, 56, 62, 64 within one or more of the segments 42, 44, 46. The decoys 54, 55, 56, 62, 64 may be used to obfuscate the other messages included in the same segment 42, 44, 46 or another segment 42, 44, 46. The decoys 54, 55, 56, 62, 64 may be used to confuse or instruct the output device to execute operations in a manner that is in conflict or against the instructions conveyed with the boundary markers 52, 58, 60, 68, 70 or segment identifiers 72, 74, 76, such as to indicate an incorrect beginning or ending of one of the segments 42, 44, 46 and/or to identify one of the segments 42, 44, 46 as something other than it is. This can be helpful in thwarting unauthorized devices attempting to illegally or impermissibly manipulate the programming event.

Any number of decoys 54, 55, 56, 62, 64 may be used and positioned at any location within the segments 42, 44, 46. The illustrated arrangement includes a set of first 54 and second 56 decoys before an actual ending of a segment. The decoys 54, 56 may identify themselves with different data encryption methodologies or protocols in a manner that could cause an unauthorized device to incorrectly decrypt it as being the actually ending of the segment (an authorized device would understand the message to be a decoy and discard its instructions). Another set of third 62 and fourth decoys 64 can be positioned after a boundary marker 58 indicating the actual ending of the first segment 42 and adjoining a backside of a boundary marker 60 indicating a beginning of the next segment 44.

One method of deploying the decoys 54, 55, 56, 62, 64 may include assessing the content carried within the segments 42, 44, 46. If a content segment is preceding an adjoining advertisement segment, decoys may be included in the content segment to hide or otherwise confuse devices from identifying the upcoming advertisement segment, whereas decoys may not be necessary when the content segment is preceding an adjoining content segment or other non-advertisement segment where it may be less necessary to obfuscate the ending/beginning of the segment.

The series of segments 42, 44, 46 can be relatively static or they may also be dynamic. Network programming is generally static, in that a programmer, such as ABC, might publish a schedule of ad breaks and affiliate content avails (local news) that remains the same for months or years. However, there can be interruptions to a fixed schedule; for instance during a special news announcement. Given the real-time nature of broadcast, affiliates and distributors receive and act upon a network's schedule, but the present invention can be used to accommodate last minute changes to the programming. On demand programming is by nature more flexible than broadcast. Segments may be stitched together arbitrarily at play-out, governed only by business rules, not technical constraints.

There may be many ways to communicate segmentation information between business units like programmers and distributors, but they fall into two categories. Out-of-band (OOB) segmentation information may be exchanged between entities by means unconnected to the physical transport of the associated content. OOB segmentation information essentially provides a 'map' to a piece of content. It may come in the form of SCTE 118 tables, and may indicate the relative position of logical segments with content, and information about business logic to be applied to segments.

In-band (IB) segmentation information, referred to as segmentation descriptors, can be embedded into a video signal to mark segment boundaries and identify segments. SCTE 35 and DVB-SAD are formats that can be used for this purpose. Content segments may be identified by a series of messages embedded into a content stream, each message containing a value that indicates the identity of the associated content. This value might be used to associate a segment with a set of business rules. The values may be encrypted such that only authorized devices are able to determine the value.

IB signaling may be used to physically demark and identify segments and business rules to be applied to segments should be transmitted OOB. This allows changing sets of business logic to be applied to the same set of content segments. Both IB and OOB information may be treated differently at different points in the content distribution chain. For instance, broadcast and VOD might require different types of information, and MSO systems might require different information than client devices.

The ability of the present invention to accurately identify segments 42, 44, 46 and/or actual segment boundaries 90, 92 allows it to provide a deterministic mechanism to capture audience metrics for programming and advertising. Programmers and advertisers may be able to provide internet quality measurement data of events occurring during the segments 42, 44, 46 since the output device 18 can accurately define the segment boundaries 90, 92, 94, 96 with the boundary markers 52, 58, 60, 66, 68, 70 and the segment content with the segment identifiers 72, 74, 76.

Having a clear knowledge of the programming or advertising content being delivered to the output device 18 can enable a broad range of advertising products. Some examples include: DVR based long form advertising (ex. TiVo showcases), ad replacement of advertising in recorded programs, programming specific unbound applications, etc. While today many advertising campaigns are based on channel, specific time or day part, etc., longer term advanced advertising products will tie specifics about the programming and/or user or individual viewer to a campaign to deliver increasingly relevant advertising.

Today, DVR recordings are based solely on schedule information passed in EPG data feeds. This data source, while reliable for episodic TV, has proven less than reliable when it comes to live events (ex. sporting events, live reality programming, etc) where the actual airing of the program may shift by minutes to hours. Supporting identification and delineation in accordance with the present invention will allow a more robust DVR implementation that should improve the user experience. This delineation can also add support for applications that can benefit from accurate bookmarks, chaptering, video clip looping, play listing, and other types of data or data markers included within one or more of embedded segment messages.

Client-side DPI requires accurate identification of placement opportunity boundaries to satisfy expectations of entertainment and advertising content providers. It is unacceptable to both constituents to clip entertainment content or show a portion of an underlying advertisement during advertisement replacement during live presentation or replacement during DVR playback. The segmentation provided by the present invention solves the problems through segment identification and segment boundary definition.

Segment identification is provided by periodically placing one or more segmentation identifiers 72, 74, 76 within a segment such that a content processor may unambiguously identify the segment. Periodic placement of multiple segment identifying messages may allow a content processor to acquire the segment at an arbitrary point and still be able to identify it, as when a viewer tunes into a broadcast channel half-way through a show. Segments boundaries may be indicated by placement of messages at and near actual boundaries 90, 92, 94, 96. The boundary messages 52, 58, 60, 66, 68, 70 may also include segment identification information in addition to the boundary information, providing multiple uses for a single message.

In certain cases an MSO may want to restrict access to signaling to authorized receivers or applications. The present invention contemplates at least two approaches to defeating access or proper behavior of unauthorized receivers or applications. One approach includes having message bodies that are encrypted in order to ensure only authenticated devices can retrieve the information contained within the message.

The encryption may include, for example, using a monitor application to hide a symmetric key (Key-1) using key hiding/code obfuscation techniques. A message body can be encrypted using a second encryption key (Key-2), and this second key can be sent as an encrypted message, using the first key (Key-1), to the monitor application. The monitor application can then decrypt this message using Key-I to retrieve Key-2. The device could then decrypt the message body using Key-2 and make it available to system functions and authorized applications. Key-2 can be changed periodically for added security, and if Key-1 is compromised a new version of the monitor application may be downloaded to the device with a new Key-1. The security model for leased devices an be similar if a trusted ETV application is used.

A variety of approaches may be applied to confuse a non-approved receiver or application from properly processing signals. One method may include clustering a series of messages at boundaries to confuse unauthorized interpreters of the content from guessing at boundaries based on physical placement of messages. For example, a cluster of messages (boundary, identifying, and/or decoy) might be embedded before and after boundaries in order to defeat inferring boundary points based on placement of messages. Each message/descriptor might contain information, available only to authorized interpreters, that indicates whether it's a decoy or an actual boundary marker. Decoy identifiers might contain segment identification values of the current segment, the following segment for identifiers that appear before the boundary, and the previous segment for those that appear after the boundary.

Another way of obfuscating boundaries is to schedule the interpretation of an identifier against a media timeline. In this scenario, a descriptor may be embedded in the stream well before a boundary, and a time offset within the descriptor informs an authorized device when the boundary will actually be reached. FIG. 3 illustrates a transport stream 100 using an offset message scheme in accordance with one non-limiting aspect of the present invention. As shown, a first beginning boundary marker 102 is positioned at an actually beginning 104 of a segment 106 while offset ending and beginning boundary marker groups 108, 110 are used offset actual boundaries 112, 114 of following two segments 116, 118. The offset messages 108, 110 can include information to schedule the interpretation of the identifier message against the media timeline in order to identify the actual boundaries 112, 114 relative to the positioning of the offset boundary messages within the segments. While not shown, decoy messages may be used in cooperation with the illustrated offset boundary marker messages to further obfuscate segment identifications.

Any type of message protocols or format may be used to support the message offsetting or any of the other decoying, identifying, or boundary marking functions contemplated by the present invention. Given that SCTE 35 is widely used in the transmission of content from programmers to MSOs, and given OCAP does not currently support SCTE 35, and given that legacy receivers are not expected to be able to support SCTE 35, there does not appear to be a single message protocol that could in practice be applied universally. Therefore, it appears that the optimal approach is for MSOs to continue to acquire content using SCTE 35 as the means for segment identification, and then to translate into DVB-SAD and EISS to accommodate both OCAP and legacy receivers. This proposes that MSO 'dual-carry' content segment identifiers using an OCAP format and a legacy format. Because of the more accurate timing model provided by DVB-SAD, it is not proposed that OCAP receivers simply process EISS.

One non-limiting aspect of the present invention supports reliable identification of content segments within a video stream to enable several advanced media services. The following are just three examples: Digital Program Insertion (DPI) that relies upon accurate boundary demarcation of segments, comprehensive tracking of media consumption is made more accurate with segment identification physically present in content, and recording of content segments on DVRs is made more accurate.

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of identifying segment boundaries for a sequence of segments forming a programming event transported within a transport stream, the method comprising:

embedding segment messages within each segment of the transport stream used to transport the programming event;

wherein at least two messages, defined as boundary marker messages, are embedded within each segment to identify segment boundaries, a first one of the boundary marker messages identifying a beginning of the segment and a second one of the boundary marker messages identifying an ending of the segment; wherein at least one message, defined as a decoy message, is embedded within each segment to obfuscate at least one of the boundary markers; and embedding data within at least a portion of the boundary markers and the decoys, the data embedded in the boundary markers identifying an actual ending or beginning of the segment and the data embedded with the decoys identifying a decoy ending or beginning of the segment, the decoy ending or beginning being different from the actual ending or beginning.

2. The method of claim 1 further comprising, for a selected one of the segments, embedding the segment ending boundary marker message before an actual ending of the segment.

3. The method of claim 2 further comprising embedding at least one decoy message between the segment ending boundary maker message and the actual ending of the selected segment.

4. The method of claim 2 further comprising embedding at least one decoy message before the segment ending boundary marker message.

5. The method of claim 2 further comprising including offset data within the segment ending boundary marker message, the offset data specifying the actual ending of the segment relative to a location of the segment ending boundary marker message.

6. The method of claim 1 further comprising, for a selected one of the segments, embedding at least one decoy message before the segment ending boundary marker message.

7. The method of claim 6 further comprising, for the segment following the selected one of the segments, embedding at least one decoy message to adjoin a backside of the segment beginning boundary marker message.

8. The method of claim 1 further comprising, if the segments having content are defined as content segments and segments having commercials are defined as advertisement segments, including decoy messages only in the content segments preceding advertisement segments and not the content segments preceding content segments.

9. The method of claim 1 further comprising encrypting each message within a first set of encryption keys and data included within the messages with a second set of encryption keys.

10. The method of claim 9 further comprising:
transmitting the first set of encryption keys to a device used to playback the programming event prior to transmission of the programming event; and
including the second set of encryption keys within the transport used to transport the programming event.

11. The method of claim 1 further comprising embedding each message within a program data elementary stream if the transport stream is an MPEG transport stream.

12. The method of claim 1 wherein the programming event is one of a linear television transmission or a non-linear television transmission.

13. The method of claim 1 wherein at least one message, defined as a segment identifier message, is embedded within each segment to identify segment content such that each of the segments include at least one segment identifier, one decoy, and two boundary markers messages.

14. A method of limiting a device used to playback content from accurately identifying segment boundaries, the method comprising:
embedding decoy boundary markers within one or more segments used to define the content, the one or more of the decoy boundary markers indicating a segment ending or beginning other than an actual segment ending or beginning defined with a boundary marker, the decoy boundary markers obfuscating at least one of boundary markers; and
wherein the data embedded in the boundary markers identify an actual ending or beginning of the segment.

15. The method of claim 14 further comprising clustering the decoy boundary markers next to boundary markers positioned at actual segment endings and beginning.

16. The method of claim 15 further comprising clustering at least one decoy on each available side of the beginning and ending boundary markers.

17. The method of claim 14 further comprising embedding boundary makers within one or more segments at a location offset from the actual segment endings or beginnings, the boundary markers including offset data for indicating the actual ending or beginning of the segment relative to a location of the segment ending or beginning boundary marker within the segment.

18. A system for supporting digital program insertion (DPI) comprising:
a transmission source configured to transmit content within a transport stream composed of a sequence of segments where one or more of the segments are identified for DPI, the transmission source embedding boundary markers and decoy boundary markers within one or more of the segments to obfuscate the one or more segments identified for DPI; and a device configured to process the transport stream for output to a user, the device performing the DPI, the device being configured to accurately identify the one or more segments identified for DPI by differentiating between the boundary markers and the decoy boundary markers; and wherein the transmission source embeds data within at least a portion of the boundary markers and the decoys, the data embedded in the boundary markers identifying an actual ending or beginning of the segment and the data embedded with the decoys identifying a decoy ending or beginning of the segment, the decoy ending or beginning being different from the actual ending or beginning.

19. The system of claim 18 wherein the transmission source is further configured to offset the boundary markers from actual segment boundaries and the device is configured to identify the actual segment boundaries from the offset boundary markers.

* * * * *